United States Patent [19]

Latimer et al.

[11] Patent Number: 4,538,510
[45] Date of Patent: Sep. 3, 1985

[54] CONVEYORS

[75] Inventors: John Latimer; Neil Fortune, both of Auckland, New Zealand

[73] Assignee: Mauri Brothers & Thomson (N.Z.) Limited, Auckland, New Zealand

[21] Appl. No.: 555,645

[22] Filed: Nov. 28, 1983

[30] Foreign Application Priority Data

Nov. 26, 1982 [NZ] New Zealand .................. 202632

[51] Int. Cl.³ ............................................. A01J 25/00
[52] U.S. Cl. ......................................... 99/459; 99/461; 99/465; 100/118; 198/853
[58] Field of Search ................ 99/452, 453, 456–459, 99/460–462, 464–466; 426/490, 491, 495, 582, 583; 198/853, 836; 100/118–120

[56] References Cited

U.S. PATENT DOCUMENTS 3,796,317 3/1974 Lippert et al. .................. 100/118 X
4,309,941 1/1982 Brockwell ........................ 99/459 X
4,438,838 3/1984 Hodlewsky ........................ 198/853

Primary Examiner—Timothy F. Simone
Attorney, Agent, or Firm—Holman & Stern

[57] ABSTRACT

A slatted endless plastics conveyor belt preferably with draining slots therethrough is supported over its conveying distance on a bed of runners and passes about end sprockets engaging directly with the belting and one set of which is driven. The edge of the belt is specially shaped to provide a bearing face supported on an inclined step in the side wall of the housing. This arrangement confines the product on the belt while it is "worked" by transverse mechanical manipulators at intervals along the conveying length. The conveyor is used in a food processor principally for processing curd or curd and whey in the cheese industry.

11 Claims, 7 Drawing Figures

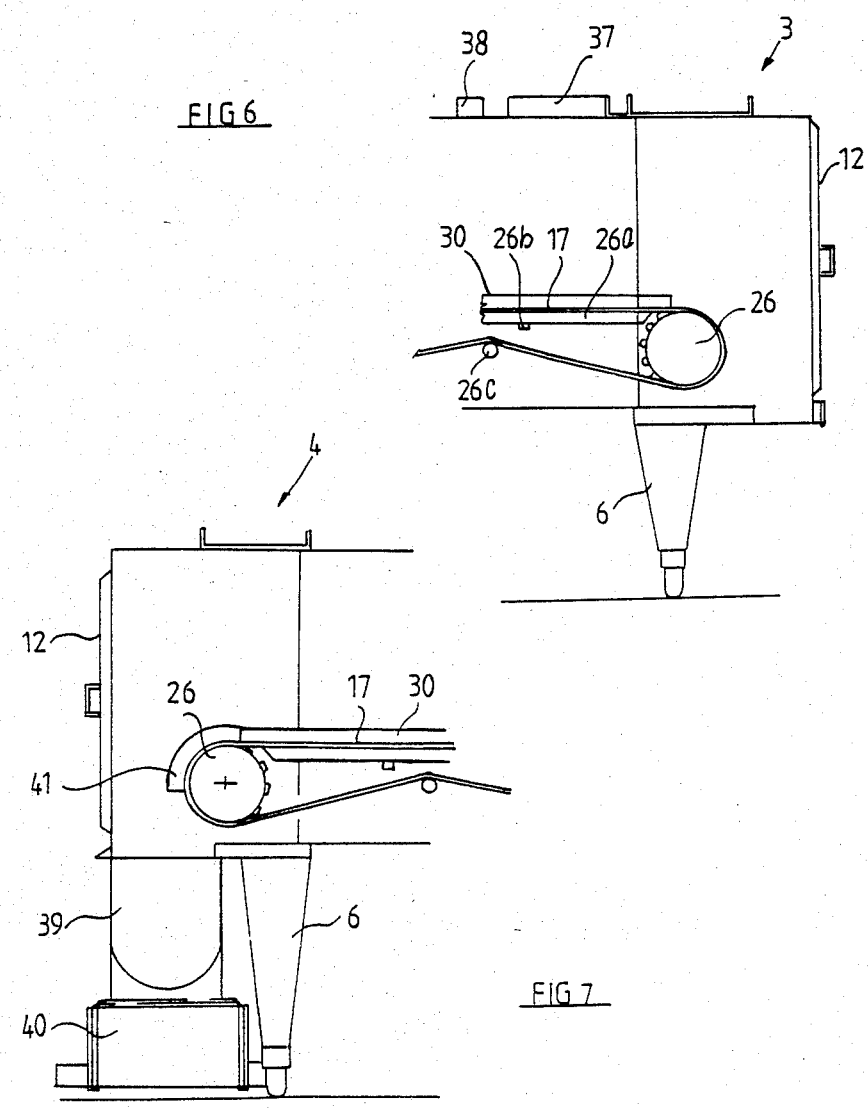

CONVEYORS

BACKGROUND OF THE INVENTION

1. Field of the Invention

The invention is concerned with conveyors which are used in the food processing industry and in particular draining conveyors used in cheese making processes. The invention is also concerned with the food processing apparatus incorporating such conveyors.

2. Description of the Prior Art

In one application in the cheese making process the curd and whey is delivered to a draining conveyor which is made up by a perforated stainless steel belt, normally an endless slatted belt, supported on suitable drive chain passing about sprockets, at least one of which is driven. In another application, curd is delivered on to the conveyor for salting. It is necessary to keep the curd on the belt along the conveying distance while the curd is mechanically manipulated as part of the processing. Stationary sides with a slidable interface with the top of the belt have been used to confine the curd during movement along the conveying distance. Such a construction achieves the desired objectives by using a considerable number of expensive components requiring fabrication and fitting and much of this has been eliminated with the present invention.

Also in the food processing industry a high standard of hygiene is required. Stainless steel has been a preferred material in such applications, for example, the slatted stainless steel belt referred to above, but at a high cost.

THE BRIEF SUMMARY OF INVENTION

It is an object of the present invention to provide a conveyor and apparatus incorporating such a conveyor which will operate effectively in a food processing environment while providing side confinement of the product being conveyed without top mounted side retaining members.

Accordingly the invention consists in a conveyor comprising an endless plastics conveying belt made up of a plurality of interconnecting members hingedly joined transverse of the belt, said members being supported on a bed of runners along the conveying distance and engageable in use about sprockets to drive and turn the belt, sprockets at each end of the conveyor length and about which said belt is moved in use, a drive means for one set of sprockets, a side member along the longitudinal edges of the conveyor, each said side member incorporating an inclined support step upon which the edge of the conveyor can run in use so that the inclined step above the belt and section of the side above the step provides the product confining means and allows the belt to move on the inclined surface to accommodate any dimensional variations.

The edge of the belting is modified to provide a supporting surface which in use, slidably engages the surface of the inclined step.

The belt has a plurality of slots formed therethrough to allow drainage and as indicated above, this is necessary where the belt is used in the cheese making process.

In a further aspect the invention consists in food processing apparatus comprising a conveyor as set forth above with a slotted draining belt and a housing surrounded said conveyor, said housing incorporating the side members of the conveyor and having product inlet means to deliver product to the infeed of the conveyor, product outfeed means to discharge product delivered from the discharge end of said conveyor and a plurality of transversely disposed rotary product manipulators at spaced intervals along the top of said conveyor.

The apparatus may be used in the cheese industry as a draining conveyor or a salting conveyor and would incorporate in both instances, a clean in place washing system.

BRIEF DESCRIPTION OF THE DRAWING

The invention will now be described with reference to the accompanying drawings wherein:

FIG. 6 is a schematic elevational view showing the infeed end of a curd salter according to the present invention; and FIG. 7 is a schematic elevational view showing the discharge end of both the curd drainer and curd salter.

DETAILED DESCRIPTION

The preferred embodiment of the present invention will be described with reference to its application in the cheese processing industry but the invention could be used in other applications and it is not intended to be limited to this one field.

Figure 1:
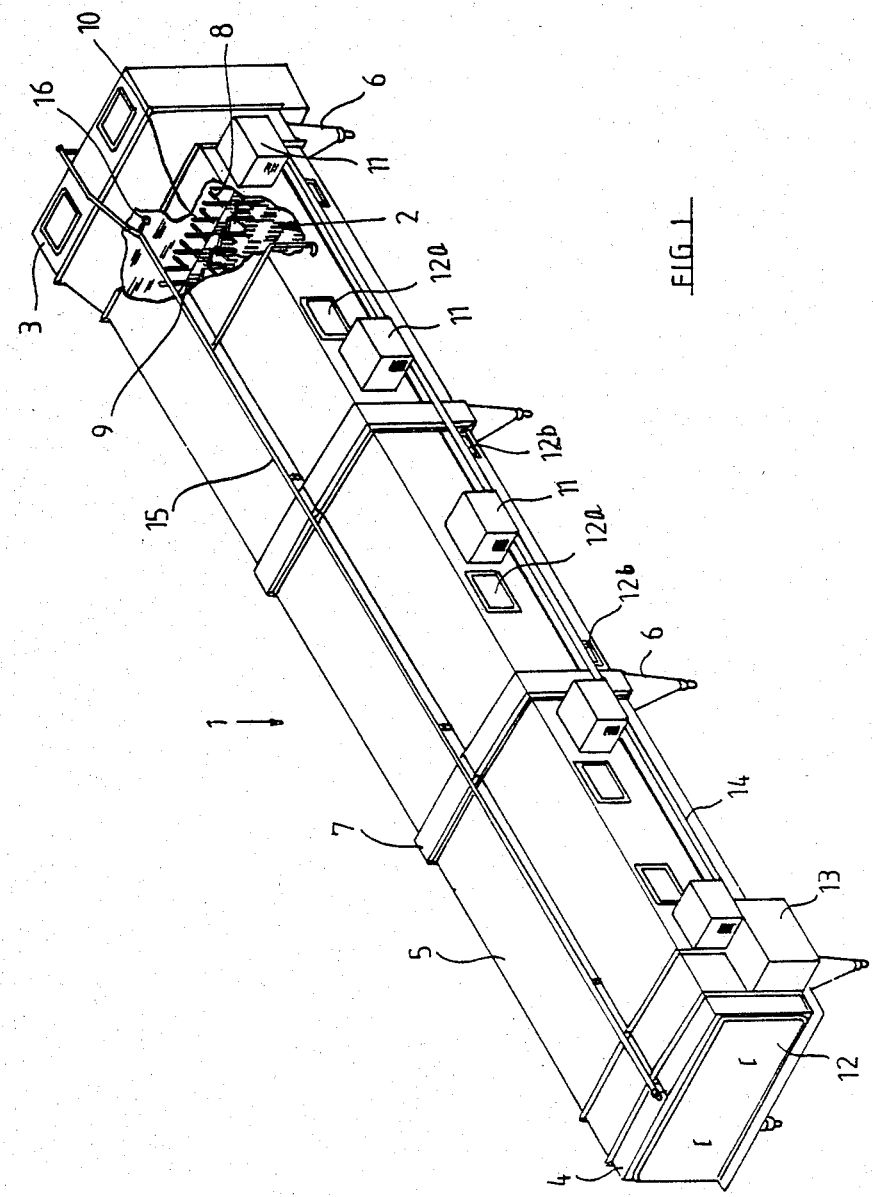
FIG. 1 is a perspective view of food processing apparatus with the conveyor of the present invention.
Figure 2:
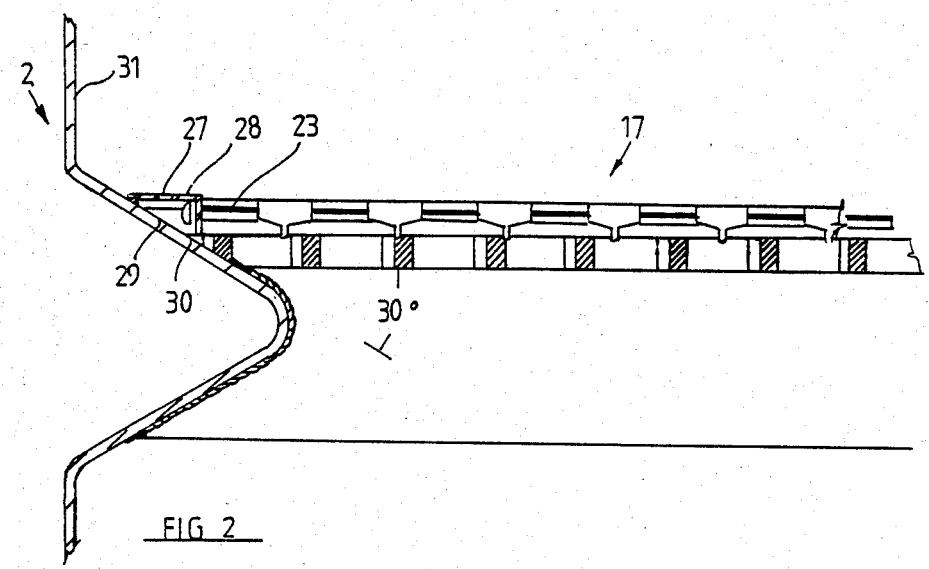
FIG. 2 is a cross-sectional detail view through part of the conveyor according to the present invention.

The conveyor according to the present invention is ordinarily incorporated in food processing apparatus of the type generally designated 1 in FIG. 1. The apparatus has a draining conveyor 2 designed to convey curd from the inlet end 3 to the discharge end 4. The conveyor is enclosed within a housing 5 preferably formed from stainless steel supported on legs 6 and incorporating a number of stiffening frames 7.

At intervals along the conveying length are mounted transverse rotary product manipulators 8. Each product manipulator has a rotatable drive shaft 9 from which extend a plurality of radial fingers 10 designed to "work" the product as it is moved along the surface of the belt. The fingers 10 are preferably stainless steel tubes with a closed and flattened outer end and the arms operate within a working tolerance of the top surface of the draining belt. The shaft 9 is driven by a motor appropriately housed and indicated at 11 on the drawing.

The end panels of the housing are removable and as is illustrated in FIG. 1, the end panel 12 visible in that view is able to be removed to allow access to the conveyor for maintenance or for any other reason. Also a number of small inspection panels 12a and 12b are provided through the side of the housing. The panels 12a allow for inspection of the rotary manipulators and the panels 12b allow for inspection and removal of the support rollers for the return path of the conveyor.

An electrical junction box 13 has a distribution conduit 14 supplying the power leads to the motors 11. A clean in place washing system is incorporated in the machine and the main water pipe 15 has connected thereto washing heads 16 and branch cleaning pipes.

Figure 3:
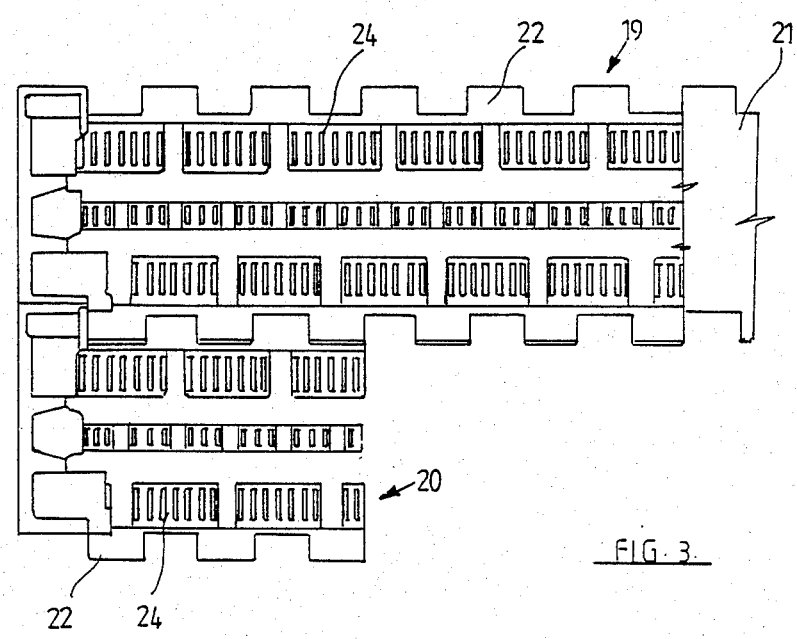
FIG. 3 is a top plan view of a detail of the belt used in the conveyor.

The conveyor 17 comprises a flat topped plastics belt 18 which may be a modified Intralox USDA flat top belting. The belting has transverse slats which are made up of stepped sections or modules with end half sections or modules in alternate rows. The modified end full section 19 and half section 20 are shown in FIG. 3 with part of the ordinary full section 21. Each section making up the transverse slat has hinge lugs 22 which interfit and the members are joined together by a hinge pin 23.

Figure 4:
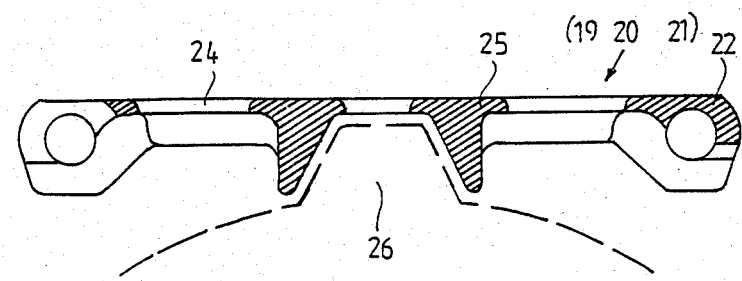
FIG. 4 is a cross-sectional detail of the belt section showing the engagement between the sprocket and the belt.

The top surface of the belt is flat and, in the drainage form of the conveyor, has slots 24 formed therethrough. Three rows of slots are preferably formed through each section. The under surface of the belting is ribbed for strength and the ribs 25a and 25b provide support contact with a bed of runners upon which the conveyor belt is supported over the conveying distance. The transverse ribs 25a also form an engagement recess for the sprockets 26 as is diagrammatically illustrated in FIG. 4. Thus the sprockets engage the belting to directly drive it. The longitudinal ribs 25b have protruding parts over the hinge pin aperture which also engage on the runners.

The drive sprockets would be at the discharge end of the conveyor and are driven by a suitable electric motor. The sprockets at the inlet end are idler or return sprockets.

The bed of belt support runners is made up of longitudinal edge supported stainless steel bars 26a mounted on transverse support members 26b supported in the housing. The bars 26a are arranged in a cheveron pattern to even the wear across the belt. The return flight of the belt is supported by passing over a series of rollers 26c. The weight of the belt suspended between rollers acts as a means of belt tensioning and the flexing of the belt as it passes over these rollers assists with cleaning the belt during the washing process.

The edge of the belt has been modified by forming the special edge members 19 and 20 having a moulded edge section 27 with the top surface 28 raised slightly above the flat upper surface of the belt and the under surface 29 inclined to co-operate with and form a sliding contact along the upper surface of the inclined step 30.

The inclined step is formed as part of the side 31 which may be incorporated in the machine housing 5 so that the inner surface of the housing and the upper surface of the inclined step 30 above the contact point with the belt provide product confining means. The construction also allows for any dimensional variations which may occur, for example, with temperature difference to be accommodated by the belt riding up or down the inclined surface slightly. The inclination of the top face of the step is 30° but that can be varied provided there is sufficient angle to be able to retain the edge detail and to avoid the belt rising with dimensional variations to interfere with the rotary manipulators.

Figure 5:
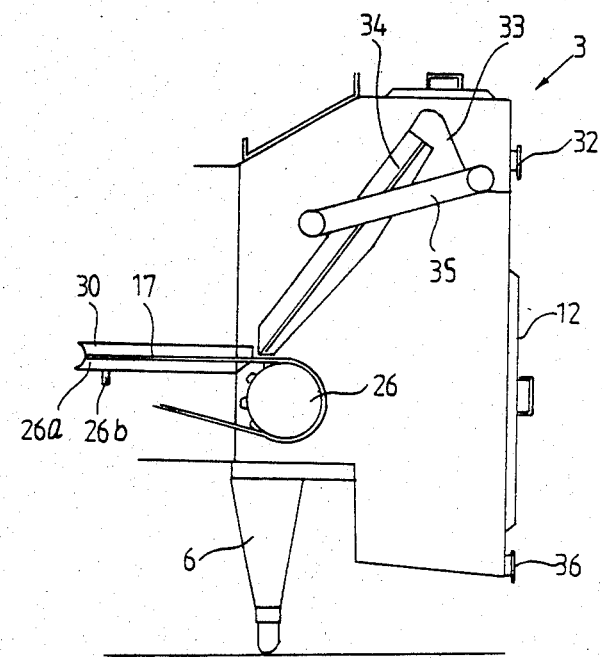
FIG. 5 is a schematic elevational view showing the infeed end of a curd drainer according to the present invention.

A detail of the infeed end of the apparatus in the curd draining mode is shown in FIG. 5. The conveyor 17 passes about an end sprocket 26. The inlet end 3 has curd and whey inlet openings 32 delivering product behind a weir 33 to obtain a substantially even distribution of product prior to discharge over a stainless steel slotted draining screen 34 which is fixed at the optimum draining angle as specified by the manufacturer of the screen. A valve controlled weir draining tube 35 is also provided to allow the product behind the weir to be delivered over the screen at the end of processing. The drained whey is discharged through the whey outlet 36. A substantial amount of whey is removed from the curd prior to delivery onto the top surface of the conveyor 17 and the curd is transported along the conveyor with the draining slots allowing the draining to be completed prior to the curd reaching the discharge end.

In FIG. 6 a modified construction is shown. In this instance the apparatus is being used as a curd salting belt or conveyor. The inlet end 3 of the housing is modified to incorporate a curd inlet 37 where drained or cheddared curd can be delivered to fall on to the top surface of the conveyor 17. The salt inlet 38 allows the salt to be added to the conveyor with the rotating beaters or manipulators mixing the salt with the curd. The end fingers of the manipulators may have a set which in use will cause the curd to be moved away from the edge.

The discharge end 4 of both conveyors is illustrated in FIG. 7. The curd is dropped from the end of the conveyor 17 into a screw conveyor 39 and rotary valve 40 for further advancement through the cheese processing steps. The step 30 should be continued about substantially 90° of the drive sprocket 26. This can best be achieved by welding a suitably shaped stainless steel quadrant 41 to the housing. This stops the curd falling on to the back of the belt.

The present invention has a number of important advantages. The housing which is kept to clean and simple lines and designed to allow little or no leakage when in use or more particularly when the apparatus is being cleaned with the usual cleansing agent. The cleansing agents are necessarily designed to be penetrating and with existing apparatus leave unsightly stains in places where the cleansing liquid penetrates past seals on inspection panels. The present construction has been designed to minimize this disadvantage.

More importantly the conveyor is of a simple and yet highly effective construction. Using the flat topped slotted plastic belting and supporting the modified edges on the inclined surface give additional support and also provide the product confinement necessary.

What is claimed is:

1. A conveyor comprising:
    an endless plastics conveying belt made of a plurality of members pivotally interconnected in end to end relationship to form a belt having upper and lower flights;
    a bed of runners extending below said upper flight of said belt to support the upper flight of said belt along its length;
    sprocket means at each end of said belt between said flights around which said belt travels to drive said belt;
    drive means operatively engaged to one of said sprocket means to rotate said one sprocket means to drive said belt;
    side members extending along the longitudinal edges of said belt; and
    an inclined support step integral with each side member extending under the respective longitudinal edge of said belt to support said longitudinal edge with part of said step extending above said belt, so that said part of said step and a part of said side member above said step provide a confining means for a product being conveyed and allow said belt to move up and down the inclined surface on the step to accommodate dimensional variations in said belt.

2. A conveyor as claimed in claim 1 wherein:
said plurality of members forming the belt comprise slats;
adjacent slats are pivotally connected together by a hinge pin;
adjacent slats have stepped edges where pivotally connected so that the pivotally connected portions are staggered;
ribs are provided on the under surface of said slats engageable with said runners and with said sprocket means so that said slats are driven by said sprocket means; and
said slats along said longitudinal edges of said belt have the under surface of their outer edges adjacent said side members cut away at an incline to provide bearing surfaces conforming to the inclined surface of the respective step, and a recess to accommodate a head on said hinge pin.

3. A food processor comprising:
a housing;
a conveyor operatively mounted in said housing comprising,
an endless plastics conveying belt made of a plurality of members pivotally interconnected in end to end relationship to form a belt having upper and lower flights,
a bed of runners extending below said upper flight of said belt to support the upper flight of said belt along its length,
sprocket means at each end of said belt between said flights around which said belt travels to drive said belt,
drive means operatively engaged to one of said means to rotate said one sprocket means to drive said belt,
side members integral with said housing extending along the longitudinal edges of said belt, and
an inclined support step integral with each side member extending under the respective longitudinal edge of said belt to support said longitudinal edge with part of said step extending above said belt, so that said part of said step and a part of said side member above said step provide a confining means for a product being conveyed and allow said belt to move up and down the inclined surface on the step to accommodate dimensional variations in said belt;
product inlet means in said housing adjacent one end of said conveyor belt to facilitate delivering product onto said belt;
product outlet means in said housing adjacent the other end of said conveying belt to facilitate discharging product from said belt; and
a plurality of rotatable product manipulators within said housing at spaced intervals above the top surface of said upper flight of said belt adapted to engage with and move product on the top surface of said belt with respect to said top surface.

4. A food processor as claimed in claim 3 wherein:
said upper flight of said belt is substantially planar;
the top surface of each support step is inclined at an angle of substantially 30° with respect to the plane of said upper flight of the belt; and
the under surface of said belt at each longitudinal edge is inclined at an angle substantially conforming to said angle of inclination of said top surface of the step at said respective edge to provide a bearing surface for running on said step.

5. A food processor as claimed in claim 3 wherein:
said plurality of members forming the belt comprise slats;
adjacent slats are pivotally connected together by a hinge pin;
adjacent slats have stepped edges where pivotally connected so that the pivotally connected portions are staggered;
ribs are provided on the under surface of said slats engageable with said runners and with said sprocket means so that said slats are driven by said sprocket means; and
said slats along said longitudinal edges of said belt have the under surface of their outer edges adjacent said side members cut away at an incline to provide bearing surfaces conforming to the inclined surface of the respective step, and a recess to accommodate a head on said hinge pin.

6. A food processor as claimed in claim 3 wherein, said upper flight of said belt is substantially planar, and the top surface of each support step is inclined at an angle of substantially 30° with respect to the plane of said upper flight of the belt.

7. A food processor as claimed in claim 3 wherein each product manipulator comprises:
a rotatable shaft mounted in the housing and extending substantially transversely with respect to said belt;
a plurality of stainless steel fingers extending radially from said shaft with the locus of the outer ends of said fingers having a working clearance above the top surface of the upper flight of the belt; and
means to rotate said manipulator shaft.

8. A food processor as claimed in claim 4 wherein:
said plurality of members forming the belt comprise slats;
adjacent slats are pivotally connected together by a hinge pin;
adjacent slats have stepped edges where pivotally connected so that the pivotally connected portions are staggered;
ribs are provided on the under surface of said slats engageable with said runners and with said sprocket means so that said slats are driven by said sprocket means; and
said slats along said longitudinal edges of said belt have the under surface of their outer edges adjacent said side members cut away at an incline to provide bearing surfaces conforming to the inclined surface of the respective step, and a recess to accommodate a head on said hinge pin.

9. A food processor as claimed in claim 8 wherein each product manipulator comprises:
a rotatable shaft mounted in the housing and extending substantially transversely with respect to said belt;
a plurality of stainless steel fingers extending radially from said shaft with the locus of the outer ends of said fingers having a working clearance above the top surface of the upper flight of the belt; and
means to rotate said manipulator shaft.

10. A food processor as claimed in claim 8 wherein said product inlet means comprises:
a stainless steel slotted draining screen mounted within the housing adjacent said one end of said conveying belt at an inclined angle with respect to the plane of the upper flight of said belt, and having a lower end above the top surface of said upper flight so that product being processed fed to said screen passes over said screen and is delivered by said screen onto said belt.

11. A food processor as claimed in claim 3 wherein, each inclined step extends above and around substantially the first quadrant of the sprocket at the other discharge end of said belt after the upper central portion of the sprocket.

* * * * *